Dec. 8, 1964 R. GOTTSCHALD 3,160,430
BALL AND SOCKET JOINTS
Filed June 11, 1962
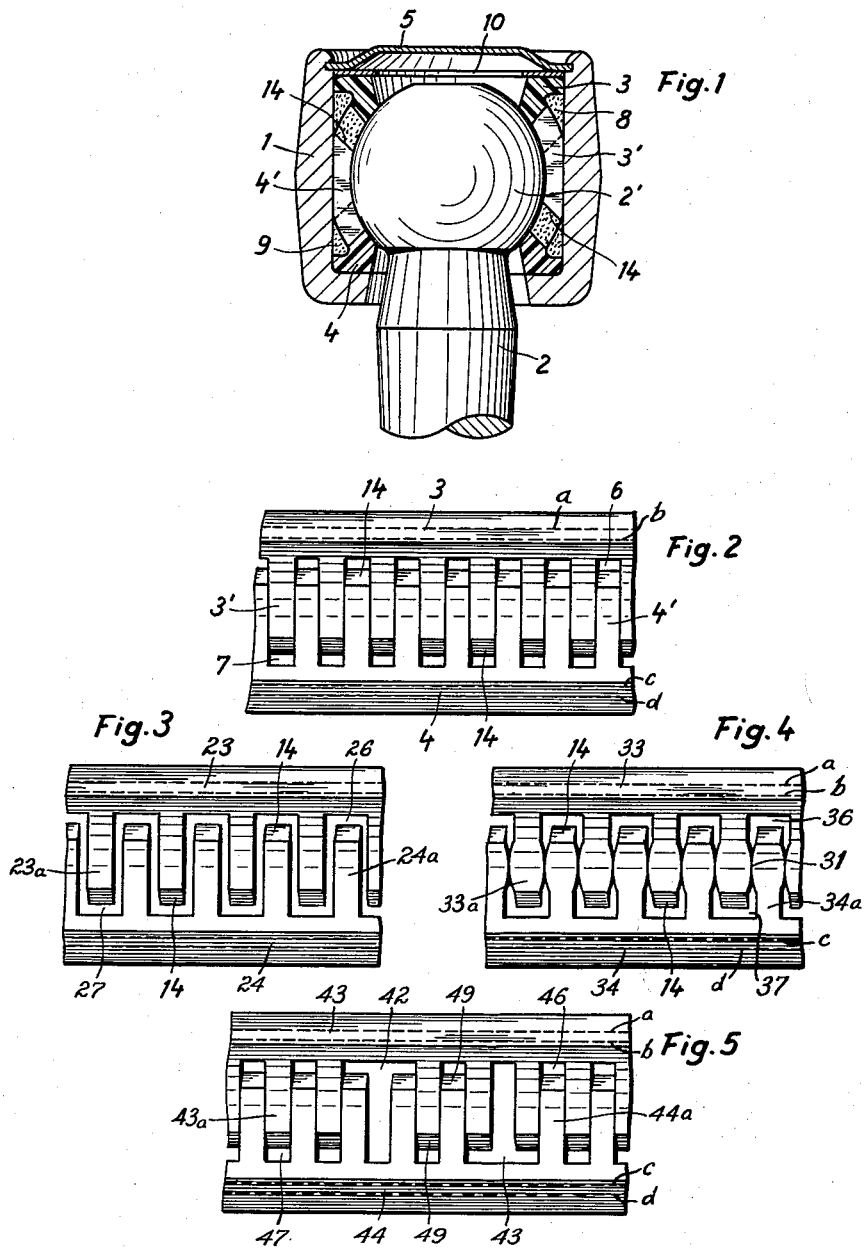
Inventor
RUDOLF GOTTSCHALD

United States Patent Office 3,160,430
Patented Dec. 8, 1964

3,160,430
BALL AND SOCKET JOINTS
Rudolf Gottschald, Osterath, Germany, assignor to Viktor Langen, Dusseldorf-Oberkassel, Germany
Filed June 11, 1962, Ser. No. 201,655
Claims priority, application Germany, June 27, 1961, E 21,294
7 Claims. (Cl. 287—87)

This invention relates to ball-and-socket joints of the kind in which the ball head is mounted in a housing lining which is formed in two parts one on each side of the ball equator.

When the lining is made in two parts, it is susceptible to wear at the intersection or separation line and this is accentuated when the separation line is at the equator where maximum wear occurs.

The extreme wear can be reduced by making one of the lining parts larger than the other so that they do not meet at the equator. It is not economically practicable however to make lining parts of different sizes.

According to the invention, each part of the housing lining is formed with teeth which extend across the equator and mesh with the teeth of the other part.

With this arrangement the discontinuity between the two parts of the lining is a tortuous junction which is less susceptible to wear than a linear discontinuity and two identical lining parts can be used.

The tips of the teeth of each lining part are preferably spaced from the roots of the teeth of the other part. The lining parts can then be brought closer to one another for re-adjustment purposes.

Each lining part may be formed with an external groove surrounding that part of the roots of the teeth to which the teeth of the other part do not extend.

This groove and the free spaces between the teeth communicate with each other and may be filled with lubricant.

A lubricant-storing ring, for example a felt ring impregnated with lubricant may be provided in each groove.

A number of modifications of a joint constructed in accordance with the present invention is illustrated in the accompanying drawings, in which:

FIGURE 1 is a central vertical section through the joint;

FIGURE 2 is a developed projection view of the two lining parts on the side facing the ball head;

FIGURE 3 illustrates a modification of the lining parts; and,

FIGURES 4 and 5 illustrate further modifications of the two lining parts.

The illustrated ball-and-socket joint comprises a housing 1, a joint pin 2 with a ball head 2' and the two lining parts 3 and 4. Each lining part extends beyond the equator of the ball head 2'. Slot-like apertures 6, 7, are provided in each lining part where it projects beyond the ball equator. The teeth 4' formed by the slot-like apertures in the lining part 4 engage in the slot-like apertures 6 in the lining part 3, while the tongues 3' of the lining part 3 engage in the slot-like apertures 7 in the lining part 4. Between the base of the slot-like apertures and the tips of the teeth a free space is left and is filled with lubricant. The two lining parts can be brought towards one another in the axial direction of the joint pin as a result of the free space, so that any play due to wear can be taken up.

Each lining part is formed with a peripheral groove 8, 9 located above that part of the slot-like apertures which is not occupied by the teeth. These apertures are filled with a felt ring impregnated with lubricant.

The grooves 8, 9 of the lining parts each has a cross-sectional profile such that the lining part can give resiliently in the axial direction of the joint pin. The grooves 8 and 9 can be seen in dotted lines a, b, c, d in FIGURES 2-5.

The housing is closed by a rolled-in lid 5. Between the lid 5 and the lining part is disposed a washer 10. By the use of washers 10 of different thicknesses it is possible to obtain different degrees of flexibility of the joint. The lining parts may also be spring-loaded to take up wear.

In the modification shown in FIGURE 3, the slot-like apertures 26 and 27 in lining parts 23 and 24 are wider than the teeth 23a, 24a engaging them so as to form interconnected lubrication spaces extending around the entire equator of the ball and to enable lubricant to be supplied to the ball surface as well.

In the modification shown in FIGURE 4, the teeth 33a, 34a formed by slots 36, 37 in parts 33, 34 are so widened at 31 as to be contiguous around the ball equator. This does not reduce the size of the bearing surface of the ball head at the ball equator.

Teeth may be omitted at some places from the lining parts in order to increase the lubricating space. This is shown in FIGURE 5, where the teeth 43a and 44a are omitted at 42 and 43.

The ends of the tongues may each be provided with a bevelling 49 at its apex and facing the ball head. The remainder of the parts 43, 44 which have slots 46, 47 are similar to those shown in FIGURE 2.

The creation of cavities distributed over the entire surface of the ball head to accommodate lubricant without impairing the mounting of the ball head of the pin is an important advantage of the invention.

I claim:
1. A ball and socket joint comprising in combination
   a stud having a ball head at one end,
   a housing receiving said ball head and having an opening for said stud at one end,
   a pair of bearing cups arranged between said housing and said ball head and disposed one on each side of the equator line of said ball head in the axial direction of said stud,
   said bearing cups having axially extending and spaced recesses at the inner end defining tongues extending across said equator line,
   said bearing cups being assembled to provide an intermeshing of said tongues of one of said bearing cups with said recesses of the other of said bearing cups,
   the length of said recesses being greater than the length of said intermeshing portion of said tongues to provide a free space at the base of said recesses in said assembled position of said bearing cups,
   a peripheral groove in each bearing cup on its outer surface above said recesses and communicating with said free space to provide interconnection of lubricant means between said recesses and said grooves of said bearing cups.

2. A ball and socket joint according to claim 1 including lubricant absorbant means disposed in said peripheral grooves.

3. A ball and socket joint according to claim 1 wherein selected tongues are eliminated on at least one of said bearing cups to increase said free space between said recesses and said tongues.

4. A ball and socket joint according to claim 1 wherein said recesses are wider than said tongues to increase said free space between said recesses and said tongues.

5. A ball and socket joint according to claim 4, wherein said tongues have intermediate transverse extensions at said equator line for making contact with adjacent tongues.

6. A ball and socket joint according to claim 1, wherein the ends of said tongues are beveled on the side facing said ball head.

7. A ball and socket joint according to claim 1, wherein said peripheral grooves have a sufficient axial dimension to impart axial elasticity to said bearing cups.

References Cited by the Examiner
UNITED STATES PATENTS

| | | |
|---|---|---|
| 2,957,714 | 10/60 | Langen. |
| 2,973,980 | 3/61 | Vogt et al. _____ 287—87 |
| 3,073,634 | 1/63 | Gottschald. |

CARL W. TOMLIN, *Primary Examiner.*